United States Patent [19]

Yamamoto et al.

[11] Patent Number: 4,599,391
[45] Date of Patent: Jul. 8, 1986

[54] COATING COMPOSITION FOR POWER CABLE

[75] Inventors: Kaoru Yamamoto, Tokyo; Takashi Inoue; Shinji Kojima, both of Yokohama; Sadahiro Nishimura, Kawasaki, all of Japan

[73] Assignee: Nippon Petrochemicals Company, Limited, Tokyo, Japan

[21] Appl. No.: 682,910

[22] Filed: Dec. 18, 1984

[30] Foreign Application Priority Data

Dec. 20, 1983 [JP] Japan ................................ 58-238838

[51] Int. Cl.$^4$ ............................................ C08F 210/18
[52] U.S. Cl. .................................. 526/282; 525/331.7; 526/281; 526/308
[58] Field of Search ................ 526/336, 282, 284, 308, 526/281; 525/387, 331.7

[56] References Cited

U.S. PATENT DOCUMENTS 3,407,158 10/1968 Guglielmino ................... 525/331.7
4,078,131 3/1978 Zarauz ............................ 526/336
4,125,699 11/1978 Yamamoto ........................ 526/336
4,259,468 3/1981 Kajiura ............................ 526/336

Primary Examiner—Paul R. Michl
Attorney, Agent, or Firm—Stevens, Davis, Miller & Mosher

[57] ABSTRACT

Provided is a power cable coating composition comprising a copolymer of ethylene or ethylene and an α-olefin with 0.02–2 mol % of a cyclic non-conjugated diene, said copolymer being prepared by a high-pressure radical polymerization process, said copolymer having a melt index of 0.2–10 g/10 min and an iodine value in the range of 0.2 to 20, and not more than 2.5 parts by weight, based on 100 parts by weight of said copolymer, of a peroxide, said composition on heat-crosslinking affording a crosslinked product having at least the following properties:

(a) a percent heat-deformation at 120° C. not more than 20%, and
(b) a maximum peak temperature (Tm) not lower than 100° C. measured according to the differential scanning calorimetry (DSC).

6 Claims, No Drawings

COATING COMPOSITION FOR POWER CABLE

BACKGROUND OF THE INVENTION

The present invention relates to a power cable coating composition capable of affording an insulation coating superior in heat resistance.

Various plastic materials have heretofore been used as power cable insulating materials. Particularly, olefinic polymers are superior in various characteristics, including electrical and mechanical characteristics and chemical stability. Above all, low density polyethylenes prepared by a high pressure process radical polymerization are inexpensive, exhibit a reduced dielectric loss, are superior in processability, can be greatly improved in heat resistance by crosslinking, and are less likely to exhibit a tree phenomenon induced by incorporation of a foreign matter such as a residual catalyst as compared with polymers prepared by ionic polymerization. Because of these various advantages, olefinic polymers are in wide use as insulating materials for electric wires and power cables.

Most important characteristics required for such insulation coating for power cable include heat resistance at service temperature (usually up to about 90° C.) and that at elevated temperatures higher than the melting point, for example, at the time of short-circuiting. The method most commonly adopted for improving such heat resistance is to increase the degree of crosslinking (gel percentage) of the insulation coating layer, and to this end it is desirable to use a highly crosslinkable resin.

Particularly, coupled with the recent labor-saving tendency, improvement of productivity and increase of voltage and capacity have been demanded for power cable, and at the same time it has been desired to improve the performance, e.g. heat resistance, of the insulation coating.

In conventional power cable insulating coatings comprising low density polyethylenes, the degree of crosslinking (gel percentage) cannot be fully improved in usual amounts of peroxides used because of insufficient crosslinkability of the low density polyethylenes, and the resultant coatings are inferior in heat resistance, that is, the percentage heat-deformation at elevated temperatures above melting points remarkably increases. Besides, an attempt to increase the molding speed for improving the productivity results in lowering of the gel percentage because of an insufficient crosslinking speed, and eventually the heat resistance is deteriorated.

On the other hand, if the amount of peroxide used is increased in order to improve the gel percentage and thereby attain a satisfactory heat resistance, scorch is apt to occur during extrusion coating, thus not only making a long-time continuous run impossible, but also causing deterioration of electrical characteristics of the insulation coating on power cable.

Further, the use of ethylene copolymer rubber alone or in combination with low density polyethylenes has also been proposed as a coating material in characteristics such as the resistance to dielectric deterioration as compared with a single use of polyethylene, but the heat resistance of crosslinked polyethylene is deteriorated by the incorporation of ethylene copolymer rubber. And in the use of ethylene copolymer rubber alone, deterioration results not only in heat resistance but also in various other characteristics such as resistance to oil, to ozone and to wear.

SUMMARY OF THE INVENTION

It is an object of the present invention to solve the above-mentioned problems.

It is another object of the present invention to provide a coating composition capable of affording a power cable insulating coating superior in heat resistance at service temperature and at temperatures above the melting point by using a highly crosslinkable ethylene copolymer and a relatively small amount of peroxide.

The present invention resides in a power cable coating composition comprising a copolymer of ethylene or ethylene and an $\alpha$-olefin with 0.02–2 mol % of a cyclic non-conjugated diene, prepared by a high-pressure radical polymerization process, said copolymer having a melt index of 0.2–10 g/10 min and an iodine value in the range of 0.2 to 20, and not more than 2.5 parts by weight, based on 100 parts by weight of said copolymer, of a peroxide, said composition on heat-crosslinking affording a crosslinked product having at least the following properties:

(a) a percent heat-deformation at 120° C. not more than 20%, and (b) a maximum peak temperature (Tm) not lower than 100° C. measured according to the differential scanning calorimetry (DSC).

DESCRIPTION OF THE PREFERRED EMBODIMENTS

In the power cable coating composition of the present invention it is essential that its heat-crosslinked product have the following properties:

(a) a percent heat-deformation at 120° C. not more than 20%, and (b) a maximum peak temperature (Tm) not lower than 100° C. measured according to the differential scanning calorimetry (DSC).

If the percent heat-deformation at 120° C. of the above (a) exceeds 20%, the insulation coating layer will become fluidized and deformed at a high temperature above the melting point, for example, in the event of short-circuiting of the cable, thus resulting in deterioration of its electrical characteristics.

And if the maximum peak temperature (Tm) measured according to DSC of the above (b) is lower than 100° C., the insulating layer will be fluidized and become thick locally at the service temperature of the cable, thus also resulting in deterioration of its electrical characteristics.

Therefore, it is essential for the power cable insulating coating to have both the above heat-resisting properties (a) and (b).

In order to overcome the foregoing problems and obtain a power calbe insulating coating having superior characteristics, the present invention employs a specific, highly crosslinkable ethylene copolymer and a relatively small amount of peroxide, whereby the heat resistance of the resultant coating can be improved.

The above ethylene copolymer which forms the power cable coating composition is a copolymer of ethylene or ethylene and an α-olefin with 0.02–2 mol % of a cyclic non-conjugated diene, prepared according to a high-pressure radical polymerization process. The ethylene copolymer may be used as a polymer blend containing said copolymer as a main component (hereinafter, both are referred to simply as "ethylene copolymer").

Preferred examples of the α-olefin as a constituent of the ethylene copolymer are those having 3 to 12 carbon atoms such as propylene, butene-1, pentene-1, hexene-1, 4-methyl-pentene-1, octene-1, decene-1, vinyl acetate, ethyl acrylate, and mixtures thereof.

The α-olefin content of the ethylene copolymer is in the range of 0 to 3 mol %, preferably not more than 1 mol %.

As examples of the cyclic non-conjugated diene in the copolymer, mention may be made of the following: cyclohexadiene, dicyclopentadiene, methyltetrahydroindene, alkenyl norbornenes such as 5-vinyl-2-norbornene, alkylidene norbornenes such as 5-ethylidene-2-norbornene, 5-methylene-2-norbornene and 5-isopropylidene-2-norbornene, 6-chloromethyl-5-isopropenyl-2-norbornene, divinylbenzene, norbornadiene, alkenylcyclohexenes such as 4-vinylcyclohexene. Particularly, 5-vinyl-2-norbornene, 5-ethylidene-2-norbornene and 4-vinylcyclohexene are preferred.

The cyclic non-conjugated diene is copolymerized in an amount in the range of 0.02 to 2 mol % with ethylene or ethylene and α-olefin. If its amount is smaller than 0.02 mol %, the crosslinkability of the copolymer will be poor and the gel percentage low, thus resulting in deterioration of the heat resistance. And if its amount exceeds 2 mol %, the crystallinity of the copolymer will deteriorate and its melting point lower, thus resulting in lowering of the cable service temperature.

Any conventional process may be used for preparing the ethylene copolymer if only it is a high-pressure radical polymerization process. For example, the ethylene copolymer may be prepared by contacting and polymerizing the monomers simultaneously or in steps in a reaction vessel or tube in the presence of a free radical catalyst and a chain transfer agent and if necessary an auxiliary agent at a temperature of 50° to 400° C., preferably 100° to 300° C., and at a pressure of 500 to 4,000 kg/cm$^2$, preferably 1,000 to 3,500 kg/cm$^2$.

As the above free radical catalyst there may be used a known initiator. Examples are peroxides, hydroperoxides, azo compounds, amine oxide compounds and oxygen.

As examples of the chain transfer agent are mentioned hydrogen, propylene, $C_1$–$C_{20}$ or more saturated aliphatic hydrocarbons and halogen-substituted hydrocarbons, e.g. methane, ethane, propane, butane, isobutane, n-hexane, n-heptane, cycloparaffins, chloroform and carbon tetrachloride, $C_1$–$C_{20}$ or more saturated aliphatic alcohols, e.g. methanol, ethanol, propanol and isopropanol, $C_1$–$C_{20}$ or more saturated aliphatic carbonyl compounds, e.g. carbon dioxide, acetone and methyl ethyl ketone, as well as aromatic compounds such as toluene, diethylbenzene and xylene.

The density of the ethylene copolymer is usually in the range of 0.92 to 0.94 g/cc.

It is important that the ethylene copolymer have an iodine value in the range of 0.2 to 20. If the iodine value is less than 0.2, the copolymer will be poor in crosslinkability, incapable of affording a power cable insulating coating superior in heat resistance. And if the iodine value exceeds 20, the melting point will lower remarkably, thus leading to a deteriorated heat resistance at the cable service temperature.

The melt index (hereinafter referred to simply as "MI") of the ethylene copolymer is in the range of 0.2 to 10 g/10 min, preferably 0.3 to 8 g/10 min. If MI is less than 0.2 g/10 min, there will occur heat generation, scorch, unevenness of flow or shark skin during extrusion, and if MI exceeds 10 g/10 min, there will occur processing troubles such as sag and local increase in thickness of the resin, thus resulting in deteriorated characteristics of the power cable insulating coating obtained.

In the case of using the ethylene copolymer as a polymer blend, preferred examples of the polymer to be blended therewith include other ethylene polymers, e.g. high-, medium- and low-density polyethylenes, copolymers of ethylene and $C_3$–$C_{10}$ α-olefins, and copolymers of ethylene and monomers having polar groups such as vinyl acetate, acrylic acid, acrylic acid ester and methacrylic acid ester. As to the blending ratio, it is desirable that not less than 60 wt. %, more preferably, nor less than 70 wt. % of the ethylene copolymer be contained in the polymer blend.

The peroxide used in the present invention is a known organic peroxide. Examples are dicumyl peroxide, tert-butyl dicumyl peroxide, 2,5-dimethyl-2,5-di(tert-butylperoxy)hexane and 2,5-dimethyl-2,5-di(tert-butylperoxy)hexyne-3. The peroxide is used in an amount not more than 2.5 parts by weight based on 100 parts by weight of the coating composition, whereby there can be obtained an insulation coating having the properties previously described. The lower limit of its amount can be determined in the range in which such properties are attainable. But, usually and preferably, the lower limit is one part by weight.

The reason why the insulation coating of the present invention has an improved heat resistance is presumed to be as follows. Because of use of the ethylene copolymer with plural unsaturated bonds introduced without lowering of crystallinity, the presence of unsaturated portion of the ethylene copolymer will increase the degree of crosslinking (gel percentage) and the crosslinking speed, thus resulting in improvement of both heat resistance and productivity.

The application of the coating composition onto a cable can be done by a conventional method involving extrusion coating of the composition onto a travelling cable conductor or the like. Then, the composition is crosslinked by steam heating, induction heating or other suitable means, whereby there can be obtained a power cable having an insulation coating. The conditions for these operations are not specially limited.

If necessary, there may be used known additives such as an anti-aging agent, a flame retardant, a voltage stabilizer, a copper damage preventing agent and carbon black, as well as rubber and filler in the range not departing from the gist of the present invention.

Thus, in the power cable coating composition of the present invention, as compared with conventional power cable coating compositions comprising low density polyethylenes, the use of only a small amount of peroxide can afford a highly heat-resistant insulation coating on power cable because there is used the specific ethylene copolymer superior in crosslinking properties such as crosslinking speed and crosslinking degree (gel percentage). Further, heat generation and scorch during extrusion are reduced to a remarkable extent and it becomes possible to attain speed-up, that is, the productivity can be improved, which is economical.

Examples and Comparative Examples are given below to further illustrate the present invention, but it is to be understood that the invention is not limited thereto as long as it does not depart from the gist thereof.

EXAMPLES 1-4

Ethylene and 5-vinyl-2-norbornene were polymerized in an autoclave at the temperature of 170° C. and pressure of 1,700 kg/cm$^2$ for 60 minutes in the presence of di-tert-butyl peroxide (polymerization initiator) and propylene (chain transfer agent), to obtain ethylene copolymers as shown in Table 1. Maximum peak temperature (Tm) measured according to DSC, percent heat-deformation, gel percentage and appearance were evaluated as set out in the same table.

COMPARATIVE EXAMPLES 1-3

Ethylene copolymers were prepared under the same conditions as in Example 1 except that the comonomer content and MI were changed outside the scope of the present invention, followed by evaluation in the same way as in Example 1, results of which are as set out in Table 1.

EXAMPLES 5-7

Ethylene copolymers were prepared under the same conditions as in Example 1 except that the kind of comonomer and MI were changed, followed by evaluation in the same way as in Example 1, results of which are as set out in Table 1.

EXAMPLE 8

70 parts by weight of the ethylene copolymer prepared in Example 1 was kneaded with 30 parts by weight of a commercially available high-pressure process low density polyethylene (trade name: Rexlon W3100, a product of Nippon Petrochemicals Co., Ltd.) (hereinafter referred to as "LDPE") for power cable by means of a plastograph, followed by evaluation in the same manner as in Example 1, results of which are as set out in Table 1.

EXAMPLE 9

Polymerization was conducted under the same conditions as in Example 1 except that n-hexane was used in place of propylene as the chain transfer agent, to obtain an ethylene copolymer having such physical properties as shown in Table 1. Then, evaluation was made in the same way as in Example 1, results of which are as set out in the same table.

EXAMPLE 10

Polymerization was conducted under the same conditions as in Example 1 to obtain an ethylene copolymer having such physical properties as shown in Table 1, to which was added 1.5 parts by weight of peroxide. Then, evaluation was made in the same way as in Example 1, results of which are as set out in Table 1.

EXAMPLE 11

Polymerization was conducted under the same conditions as in Example 9 to obtain an ethylene copolymer having a relatively large comonomer content, followed by evaluation in the same way as in Example 1, results of which are as set out in Table 1.

COMPARATIVE EXAMPLE 4

An ethylene copolymer was prepared under the same conditions as in Example 11 except that the comonomer content was changed outside the scope of the present invention, followed by evaluation in the same way as in Example 1, results of which are as set out in Table 1.

COMPARATIVE EXAMPLES 5 and 6

With respect to LDPE, evaluation was made in the same way as in Example 1, results of which are as set out in Table 1. In Comparative Example 6, the amount of peroxide added was increased to 3 parts by weight and evaluation was made in the same manner as in Comparative Example 5, results of which are as shown in Table 1.

As shown in Table 1, Examples 1-10 indicate that the percent heat-deformation is low and the gel percentage is high in comparison with conventional high-pressure process low density polyethylenes. Particularly, the ethylene copolymers prepared using 5-vinyl-2-norbornene as comonomer afforded very goods results.

Moreover, as shown in Example 8, similar effects were obtained even when there was used a blend of the ethylene copolymer with the commercial high-pressure process low density polyethylene.

In Comparative Example 1, the comonomer content and iodine value were lowered outside the scope of the present invention; as a result, no improvement was recognized with respect to the percent heat-deformation and gel percentage.

In Comparative Examples 2 and 3, there were used ethylene copolymers having MI values outside the scope of the present invention. The resultant products exhibited conspicuous surface roughening or drawdown, and their values as product were badly deteriorated.

On the other hand, in Comparative Example 4, the comonomer content and iodine value were increased outside the scope of the present invention; as a result, the maximum peak temperature (Tm) according to DSC lowered.

Test Method (1) Maximum peak temperature (Tm) measured according to Differential Scanning Calorimetry (DSC)

This temperature (Tm) is a value correlated with the crystal form and is measured in the following manner. About 5 mg. of sample is weighed and then set to DSC. The temperature is raised to 170° C. and the sample is held at this temperature for 15 minutes, then cooled to 0° C. at a rate of 2.5° C./min. Then, from this state the temperature is raised to 170° C. at a rate of 10° C./min. The temperature in the vertex position of the maximum peak appeared during the rise of temperature from 0° to 170° C. is regarded as the maximum peak temperature (Tm).

(2) Percent heat-deformation

A cylinder 10 mm in diameter and 6 mm in height is placed upright in an oil bath at 120° C. Then, a metallic plate is put thereon and pressurized from above at a load of 2.64 kg. After 30 minutes, the height of the cylinder is measured to determine a percent reduction in height, which is regarded as the percent heat-deformation.

(3) Gel percentage

To 100 parts by weight of the ethylene copolymer are added a predetermined amount of DCP (dicumyl peroxide) and 0.2 part by weight of 4,4'-thiobis(2-t-butyl-5-methylphenol), from which a 1 mm thick sheet is formed. After crosslinking at 160° C. for 30 minutes, the sheet is pulverized to pass through 20 mesh, then extracted with xylene at 120° C. for 10 hours and a percent retention is determined as the gel percentage.

(4) Appearance surface state

Using a blow molding machine (25 mm dia.) and a die having inside and outside diameters of 9 mm and 10 mm respectively, the coating composition is extruded at the same shear rate as in power cable coating, and the extruded surface state is observed with the eye.

TABLE 1

| Examples and Comparative Examples | Kind of Comonomer (part of weight of copolymer) |
|---|---|
| Example 1 | 5-vinyl-2-norbornene (100) |
| Example 2 | '' |
| Example 3 | '' |
| Example 4 | '' |
| Example 5 | 5-ethylidene-2-norbornene (100) |
| Example 6 | '' |
| Example 7 | 4-vinylcyclohexene (100) |
| Example 8 | 5-vinyl-2-norbornene (70) |
| Example 9 | 5-vinyl-2-norbornene (100) |
| Example 10 | '' |
| Example 11 | '' |
| Comparative Example 1 | '' |
| Comparative Example 2 | '' |
| Comparative Example 3 | '' |
| Comparative Example 4 | '' |
| Comparative Example 5 | — |
| Comparative Example 6 | — |

| Examples and Comparative Examples | LDPE (part by weight) | Comonomer content (mol %) | MI (g/10 min) | Density (g/cc) | Iodine value | Amount of peroxide added (part by weight) |
|---|---|---|---|---|---|---|
| Example 1 | — | 0.1 | 6.1 | 0.922 | 1 | 2 |
| Example 2 | — | 0.1 | 2.9 | 0.923 | 1 | 2 |
| Example 3 | — | 0.05 | 3.1 | 0.923 | 0.5 | 2 |
| Example 4 | — | 0.3 | 2.8 | 0.922 | 3 | 2 |
| Example 5 | — | 0.1 | 0.3 | 0.922 | 1 | 2 |
| Example 6 | — | 0.1 | 2.8 | 0.922 | 1 | 2 |
| Example 7 | — | 0.1 | 3.0 | 0.923 | 1 | 2 |
| Example 8 | LDPE (30) | 0.07 | 5.2 | 0.922 | 0.7 | 2 |
| Example 9 | — | 0.07 | 3.1 | 0.930 | 0.7 | 2 |
| Example 10 | — | 0.1 | 2.8 | 0.923 | 1 | 1.5 |
| Example 11 | — | 1.8 | 5.0 | 0.930 | 18 | 2 |
| Comparative Example 1 | — | 0.01 | 3.0 | 0.922 | 0.1 | 2 |
| Comparative Example 2 | — | 0.1 | 0.1 | 0.922 | 1 | 2 |
| Comparative Example 3 | — | 0.1 | 11 | 0.922 | 1 | 2 |
| Comparative Example 4 | — | 3.0 | 7 | 0.929 | 30 | 2 |
| Comparative Example 5 | LDPE (100) | 0 | 3.0 | 0.922 | 0 | 2 |
| Comparative Example 6 | LDPE (100) | 0 | 3.0 | 0.922 | 0 | 3 |

| Examples and Comparative Examples | DSC (Tm) (°C.) | Percent heat-deformation (%) | Gel percentage (%) | Appearance surface state |
|---|---|---|---|---|

TABLE 1-continued

| | | | | |
|---|---|---|---|---|
| Example 1 | 103 | 9 | 88 | Very smooth surface |
| Example 2 | 103 | 7 | 90 | Very smooth surface |
| Example 3 | 104 | 13 | 86 | Very smooth surface |
| Example 4 | 102 | 6 | 91 | Very smooth surface |
| Example 5 | 104 | 14 | 85 | Very smooth surface |
| Example 6 | 105 | 19 | 82 | Very smooth surface |
| Example 7 | 103 | 11 | 87 | Very smooth surface |
| Example 8 | 103 | 10 | 87 | Very smooth surface |
| Example 9 | 110 | 12 | 86 | Very smooth surface |
| Example 10 | 105 | 19 | 82 | Very smooth surface |
| Example 11 | 101 | 3 | 96 | Very smooth surface |
| Comparative Example 1 | 105 | 34 | 74 | Very smooth surface |
| Comparative Example 2 | 102 | 7 | 90 | Surface roughening is conspicuous |
| Comparative Example 3 | 104 | 12 | 86 | Drawdown is conspicuous |
| Comparative Example 4 | 95 | 3 | 97 | Very smooth surface |
| Comparative Example 5 | 105 | 34 | 74 | Very smooth surface |
| Comparative Example 6 | 103 | 15 | 84 | Scorch occurred, and surface roughening is conspicuous |

What is claimed is:

1. A power cable coating composition comprising a copolymer of ethylene or ethylene and an α-olefin with 0.02-2 mol % of a cyclic non-conjugated diene, wherein the amount of the α-olefin copolymerized in said copolymer is in the range of 0 to 3 mol % in terms of monomer, said copolymer being prepared by a high-pressure radical polymerization process, said copolymer having a melt index of 0.2-10 g/10 min and iodine value in the range of 0.2 to 20, and not more than 2.5 parts by weight, based on 100 parts by weight of said copolymer, of a peroxide, said composition on heat-crosslinking affording a crosslinked product having at least the following properties:
   (a) a percent heat-deformation at 120° C. not more than 20%, and
   (b) a maximum peak temperature (Tm) not lower than 100° C. measured according to the differential scanning calorimetry (DSC).

2. The power cable coating composition of claim 1, wherein the cyclic non-conjugated diene is selected from the group consisting of vinyl nornornene, ethylidene norbornene and vinylcyclohexene.

3. The power cable coating composition of claim 1, wherein said composition contains said copolymer in an amount not less than 60 weight percent.

4. The power cable coating composition of claim 1, wherein said polymer composition further contains an ethylenic polymer blended with said copolymer.

5. A method for forming an insulation coating on a power cable, which method comprises extrusion-coating a composition onto a cable conductor, and then heating the composition to allow crosslinking to take place to thereby convert the composition into a crosslinked product having at least the following properties:
   (a) a percent heat-deformation at 120° C. not more than 20%, and
   (b) a maximum peak temperature (Tm) not lower than 100° C. measured according to the differential scanning calorimetry (DSC), said composition comprising a copolymer of ethylene or ethylene and an α-olefin with 0.02-2 mol % of a cyclic non-conjugated diene, wherein the amount of the α-olefin copolymerized in said copolymer is in the range of 0 to 3 mol % in terms of monomer, said copolymer being prepared by a high-pressure radical polymerization process said copolymer having a melt index of 0.2-10 g/10 min and an iodine value in the range of 0.2 to 20, and not more than 2.5 parts by weight, based on 100 parts by weight of said copolymer, of a peroxide.

6. The power cable coating composition of claim 1, wherein said copolymer of ethylene or ethylene and an α-olefin with 0.02-2mol % of a cyclic non-conjugated diene has a density of 0.92-0.94 g/cc.

* * * * *